(12) United States Patent
Degioanni

(10) Patent No.: US 11,544,124 B1
(45) Date of Patent: Jan. 3, 2023

(54) UNIFIED EVENT PROCESSING AND LOG MANAGEMENT OVER MULTIPLE DOMAINS

(71) Applicant: Sysdig, Inc., San Francisco, CA (US)

(72) Inventor: Loris Degioanni, San Francisco, CA (US)

(73) Assignee: SYSDIG, INC., San Francisco, CA (US)

( * ) Notice: Subject to any disclaimer, the term of this patent is extended or adjusted under 35 U.S.C. 154(b) by 0 days.

(21) Appl. No.: 17/672,624

(22) Filed: Feb. 15, 2022

(51) Int. Cl.
  *G06F 9/54* (2006.01)
  *G06F 9/445* (2018.01)
  *G06F 9/50* (2006.01)

(52) U.S. Cl.
  CPC .......... *G06F 9/542* (2013.01); *G06F 9/44526* (2013.01); *G06F 9/5016* (2013.01); *G06F 9/5072* (2013.01); *G06F 9/541* (2013.01)

(58) Field of Classification Search
  CPC .............................. G06F 9/542; G06F 16/1734
  USPC ......................................................... 719/318
  See application file for complete search history.

(56) References Cited

U.S. PATENT DOCUMENTS

| | | | |
|---|---|---|---|
| 10,630,705 B2 * | 4/2020 | Chrosziel | H04L 63/1425 |
| 2022/0092062 A1 * | 3/2022 | Ferrar | G06F 3/04842 |
| 2022/0124150 A1 * | 4/2022 | Alagna | H04L 63/20 |

OTHER PUBLICATIONS

The Falco Project, "Plugins", https://deploy-preview-493--falcosecurity.netlify.app/docs/plugins/, retrieved Feb. 16, 2022, 6 pages.
The Falco Project, "Falco Plugins Developers Guide", https://deploy-preview-493--falcosecurity.netlify.app/docs/plugins/developers_guide/, retrieved Feb. 16, 2022, 24 pages.
The Falco Project, "Event Sources", https://falco.org/docs/event-sources/, retrieved Feb. 16, 2022, 1 page.
Sysdig.com, "Sysdig CLI for Sysdig Monitor and Secure", https://docs.sysdig.com/en/docs/developer-tools/sysdig-cli-for-sysdig-monitor-and-secure/, retrieved Feb. 16, 2022, 1 page.
Sysdig.com, "Falco Open Source Adds AWS Cloud Security Monitoring", https://sysdig.com/press-releases/falco-open-source-adds-aws-cloud-security-monitoring/, dated Oct. 12, 2021, 3 pages.

(Continued)

*Primary Examiner* — Andy Ho
(74) *Attorney, Agent, or Firm* — Hickman Becker Bingham Ledesma LLP

(57) ABSTRACT

A computer-implemented method of providing unified event monitoring and log processing is disclosed. The method comprises receiving streaming event data comprising a plurality of event entries from a plurality of domains including a cloud manager for a cloud platform and an application running within a container on the cloud platform; processing the streaming event data into a normalized, domain-independent format; evaluating a plurality of policy rules on the streaming event data, wherein the plurality of policy rules is defined with a unified syntax; and in response to the evaluating satisfying a condition of a first rule of the plurality of policy rules, transmitting to a remote device data related to an action defined in the first rule, wherein the receiving, processing, evaluating, and transmitting for each event entry for the plurality of event entries are performed in real time.

20 Claims, 7 Drawing Sheets

(56) References Cited

OTHER PUBLICATIONS

Sysdig.com, "Captures", https://docs.sysdig.com/en/docs/sysdig-secure/investigate/captures/#captures, retrieved Feb. 16, 2022, 3 pages.
Stemm, Mark, "Falco Plugins Early Access", https://falco.org/blog/falco-plugins-early-access/, dated Oct. 12, 2021, 5 pages.
Kili, Aaron, "Sysdig—A Powerful System Monitoring and Troubleshooting Tool for Linux", https://www.tecmint.com/sysdig-system-monitoring-and-troubleshooting-tool-for-linux/, retrieved Feb. 16, 2022, 20 pages.
Github.com, "Falcosecurity/Libs", https://github.com/falcosecurity/libs/blob/master/README.md., retrieved Feb. 16, 2022, 5 pages.
Github.com, "Falcosecurity Cloudtrail Plugin", https://github.com/falcosecurity/plugins/tree/master/plugins/cloudtrail, retrieved Feb. 16, 2022, 8 pages.
Degioanni, Loris, "Understanding Common Library Implementation", https://sysdig.com/blog/understanding-common-library-implementation/, dated Nov. 5, 2019, 6 pages.
aws.Amazon.com, "Centralized Logging", https://aws.amazon.com/solutions/implementations/centralized-logging/, retrieved on Feb. 16, 2022, 3 pages.
Anderson, Knox, "Sysdig Inspect Explained Visually", https://sysdig.com/blog/sysdig-inspect-explained-visually/, dated Dec. 14, 2017, 7 pages.

\* cited by examiner

FIG. 3

POLICY RULE 156A

| | |
|---|---|
| RULE NAME: | Container Shell Configuration File Modification |
| DESCRIPTION: | Detect attempt to modify shell configuration files in containers only. |
| CONDITION: | Container.EventName = "Container_Open_Write" and (<br>    fd.filename in (shell_config_filenames) or<br>    fd.name in (shell_config_files) or<br>    fd.directory in (shell_config_directories))<br>and not proc.name in (shell_binaries)<br>and not exe_running_docker_save |
| ACTION: | Notify administrator ADMIN1 |
| NOTIFICATION: | A shell configuration file has opened for modification:<br>user = %user.name<br>user_loginuid = %user.loginuid<br>file = %fd.name<br>container_id = %container.id<br>image = %container.image.repository |

POLICY RULE 156B

| | |
|---|---|
| RULE NAME: | Login without Multi Factor Authentication |
| DESCRIPTION: | Detect login without MFA for any domain. |
| CONDITION: | Global.EventName = "ConsoleLogin"<br>and not Global.ErrorCode exists<br>and Global.EventValue[LoginResult] = "Success"<br>and Global.EventValue[MFAUsed] = "False" |
| ACTION: | Notify administrator ADMIN1<br>Force logoff of %user.name |
| NOTIFICATION: | Detected a login without MFA:<br>User = %user.name<br>IP address = %user.sourceIP<br>Region = %user.targetRegion<br>Domain = %domain |

UNIFIED EVENT PROCESSING AND LOG MANAGEMENT OVER MULTIPLE DOMAINS

FIELD OF THE DISCLOSURE

The present disclosure generally relates to the technical areas of cloud environment monitoring and log data management. The disclosure relates more specifically to monitoring events from multiple domains for processing through a unified policy engine and packet-like, on-demand log analysis.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Programmatic containers ("containers") encapsulate computer program applications within individual, relatively isolated runtime environments. For example, a container may bundle into a single package an application program with its dependencies, libraries, and configuration files. Thus, containers enable portability across different operating systems and different hardware environments. In other words, containers provide many of the benefits of virtual machine instances. At the same time, containers use significantly fewer resources than virtual machine instances. For example, a container may be several megabytes in size, whereas a virtual machine instance may be several gigabytes in size.

One reason for this difference is that a container uses the operating system kernel of its host computer, whereas a virtual machine instance includes an entire operating system that runs on top of the operating system kernel of its host computer. This lightweight aspect of containers makes them popular alternatives to virtual machine instances for developing computer program applications. For example, a computer program application may be deployed at one or more times as a set of containers. Furthermore, each container may include a set of code that exhibits simplified dependencies and/or is otherwise streamlined for performance efficiency.

Events related to containerized applications can be captured and analyzed using a policy engine, which specifies and enforces rules that govern the execution of such containerized applications. These days, containerized applications often run on a cloud platform, where events can occur at various levels to various components of the cloud platform, such as namespaces or cluster nodes. All such events could affect the execution of containerized applications or otherwise be of interest to application owners. It would therefore be helpful to broaden the scope of the policy engine to cover additional events to detect and catch all relevant policy violations in real time.

On the other hand, to monitor cloud activities for performance issues, intrusion detection, forensic analysis, and other tasks, cloud log files are generated and stored on cloud nodes. Conventionally, these log files are exported to external log analysis services to perform analysis tasks. The external log analysis services translate the log files into full featured heavyweight databases that use open ended database queries to perform any analysis tasks. The export and indexing typically require extensive computing resources. On the other hand, reducing the amount of log data exported and indexed would often reduce the accuracy of log data analysis. Therefore, it would be helpful to find an alternative method of processing logs from multiple domains while reducing the costs of performing analysis tasks.

BRIEF DESCRIPTION OF THE DRAWINGS

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

In the Drawings:

FIG. 3 illustrates example unified policy rules for applying on normalized domain independent streaming event data.

DETAILED DESCRIPTION

Figure 1:
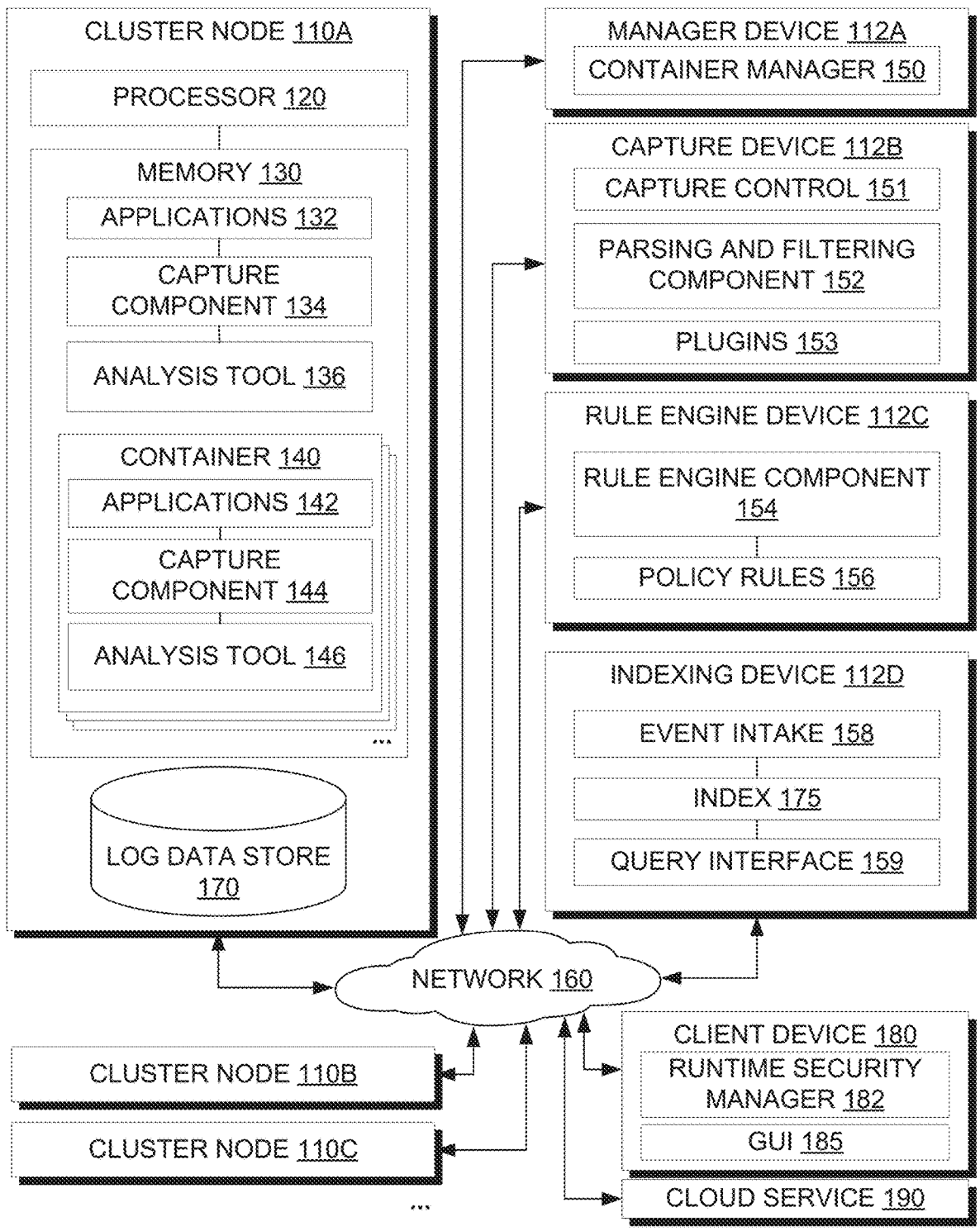
FIG. 1 illustrates an example computing architecture for providing unified event monitoring and log processing from multiple domains.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:

1.0 General Overview
2.0 Example Computing Architecture
3.0 Example Functional Diagram
4.0 Example Policy Rules
5.0 Example User Interfaces
6.0 Example Processes
7.0 Implementation Example—Hardware Overview
8.0 Extensions and Alternatives

1.0 General Overview

A system for monitoring events and managing logs from multiple domains for applying uniform policy rules and related methods are disclosed. The domains may include applications or processes within containers ("container application" or "container process"), applications or processes within hosts executing the containers, and external services such as cloud services, containerized application managers, cloud-based orchestrators, networks, and databases. Events from external services may be captured in a streaming fashion using plug-ins for each type of service. When the conditions of a policy rule match a captured event, the policy rule may trigger one or more notifications and/or remedial actions.

In some embodiments, the monitored events may be gathered in a cloud-based storage that may also host other logs from various cloud services. The gathered logs are augmented with a lightweight index for direct querying and analysis. In this manner, expensive log duplication and remote database query costs for external log analysis services can be avoided by directly accessing the events on the cloud-based storage using the index. Fields identified for exposure by plug-ins may be used to determine which fields to use when building the index.

In some embodiments, a query interface may be provided to enable query matching to the gathered entries in the cloud-based storage via the index and without performing database queries. The query interface may be used to build user interfaces to analyze the entries using defined actions such as sorting, filtering, and tracing. In this manner, logs containing event information generated from multiple domains can be retrieved from a remote source on demand in response to the actions taken. Further, since the defined actions are limited in scope compared to open ended database queries, processing overhead can be minimized.

The system supporting monitoring of events and managing of logs from multiple domains has many technical benefits. By using a unified rule syntax that is applicable to events gathered via capture modules and plug-ins from multiple domains, consistent enforcement of policies can be readily achieved compared to piecemeal monitoring of each domain. By accessing gathered events and existing logs in a cloud-based storage via an index without replication to external log analysis services, costly replication and remote database query overhead can be eliminated. Avoiding replication to external log analysis services also incentivizes the user to keep gathered events in bulk storage as-is without pre-filtering, thereby improving accuracy in query processing. Providing query interfaces to support analysis actions with limited scope can also help to reduce processing overhead compared to open ended database queries.

2.0 Example Computing Architecture

FIG. 1 illustrates an example computing architecture for providing unified event monitoring and log processing from multiple domains. System 100 of FIG. 1 includes cluster node 110A, cluster node 110B, cluster node 110C, manager device 112A, capture device 112B, rule engine device 112C, indexing device 112D, network 160, client device 180, and cloud service 190. Cluster node 110A includes processor 120, memory 130, and log data store 170. Memory 130 includes applications 132, capture component 134, analysis tool 136, and one or more container 140. Container 140 includes applications 142, capture component 144, and analysis tool 146. Manager device 112A includes container manager 150. Capture device 112B includes capture control 151, parsing and filtering component 152, and plugins 153. Rule engine device 112C includes rule engine component 154 and policy rules 156. Indexing device 112D includes event intake 158, query interface 159, and index 175. Client device 180 includes graphical user interface (GUI) 185.

While components are shown distributed across devices 112A-112D in system 100, some implementations may consolidate the components shown into fewer devices, and/ or some of the components may be co-located at any of the cluster nodes 110A-110C. While log data store 170 is shown as integral to cluster node 110A, log data store 170 may also be separate from cluster nodes 110A-110C. Data stored in log data store 170 may be stored in simple flat files rather than structured databases. While three cluster nodes are shown in system 100, any number of nodes may be included in the computing cluster of system 100. Further, while a single computing cluster is illustrated in system 100, multiple computing clusters may also be supported. Components of cluster node 110A may also be present in other cluster nodes such as cluster node 110B and 110C, which are not specifically shown in FIG. 1. Separate or shared entities may manage cluster nodes 110A-110C, devices 112A-112D, and log data store 170, allowing specific services to be handled by external parties when desired.

Container manager 150 may configure deployment, load balancing, maintenance and migration of one or more containers 140 across available cluster nodes 110A-110C. For example, container manager 150 may correspond to Kubernetes (K8s) or another cloud management platform. Container manager 150 may access a container repository for replicating and configuring predefined containers with fixed configurations. Each container 140 may execute one or more applications 142, which can be monitored for system calls and other events using capture component 144. Similarly, each host or cluster node 110A-110C may execute one or more applications 132, which can be monitored for system calls and events using capture component 134, which may correspond to the open-source Sysdig-probe offered by Sysdig, Inc. Analysis tool 136 and 146 may correspond to open source "sysdig" tool, which enables analysis of the data captured from respective capture component 134 and 144.

Capture control 151 may control capture components 134 and 144 for collecting operating system (OS) state collection from a respective host operating system of cluster node 110A and a guest operating system of container 140. For example, capture control 151 may correspond to a "libscap" library, which may implement functions similar to the "libpcap" library for network packets in the "tcpdump" tool, but for system calls or other events. Higher level components such as analysis tool 136 and 146 and rule engine component 154 may link to capture control 151 to perform event capture tasks. Capture control 151 may also read and write to memory dump files. Capture components 134 and 144 may be kernel level modules that capture system calls from their respective OS and may include a kernel module and extended Berkeley Packet Filter (eBPF) probe for linking by host applications or containerized applications to monitor, as described further in FIG. 2. The system calls may originate from OS calls generated by programs executing on cluster node 110A, or applications 132, and programs executing on container 140, or applications 142. Capture control 151 may also control plugins 153 for receiving streaming events from various external domains, such as cloud service 190.

Parsing and filtering component 152 may perform various pre-processing tasks to prepare the entries received by capture control 151 prior to further processing by rule engine component 154. For example, parsing and filtering component 152 may correspond to a "libsinsp" library. Higher level components such as analysis tool 136 and 146 and rule engine component 154 may link to parsing and filtering component 152 to perform parsing and filtering tasks. The pre-processing tasks may include event parsing, implementing a state engine, applying filtering, and converting entries into a normalized domain independent format. Event parsing may parse through event entries and extract information fields using defined names and formats. Some or all of the information fields may be defined as exposed fields for different domains via plugins 153, wherein the exposed fields can be used to build index 175. As discussed below, parsing and filtering component 152 may dynamically include plugins 153 as shared libraries. The state engine may assist in determining the state of variables and other factors which are used for conditional matching. The filtering may assist in retaining only events of interest for intended use cases, such as run-time security. Converting entries into a normalized domain independent format enables rules to apply to events originating from different domains that may have different event formats that can be normalized. Further, the formatted events may also be organized in a data structure that is efficient for reading and processing.

Plugins 153 may correspond to dynamic shared libraries (e.g. .so files for Unix, .dll files for Windows) that export functions for reading streaming events from domains. Thus, other components such as capture control 151 and parsing and filtering component 152 may dynamically load one or more plugins 153 to support event streaming and field parsing from additional domains. In some implementations, the plugins 153 may be separated according to function. For example, event streaming functions may be provided in source plugins, and field parsing and extraction may be provided in extractor plugins. New plugins 153 can be developed by defining functions required by a plugin application programming interface (API) for plugins 153. Each of plugins 153 may be configured to read events generated from a specific domain. Multiple plugins 153 may also read different events or fields from a single domain. Each of the plugins 153 may define a list of supported or exposed fields that can be extracted from streamed events. In some implementations, the exposed fields may correspond to all available fields from the events. In other implementations, the exposed fields may be less than all available fields from the events. As discussed below, the exposed fields may also be used to build index 175. The plugins 153 may be configured to read events from various event sources, including but not limited to: log files in storage locations such as log data store 170, log files identified in notification queues such as Amazon Simple Queue Service (SQS) queues, and local filesystem paths for log files. To determine whether new events are available for processing, plugins 153 may receive push notifications or perform periodic polling for new log files at the event sources.

Rule engine component 154 may evaluate policy rules 156 on the output from parsing and filtering component 152 to determine one or more notifications and actions to be carried out. Example policy rules 156 are described below in conjunction with FIG. 3. Rule engine component 154 may include a rule language compiler to convert human readable rules in policy rules 156 to machine readable rules, a rule evaluation engine for evaluating the policy rules 156, and a rule management interface for adding, modifying, and deleting from policy rules 156. When the one or more notifications and actions are determined, they may be passed to a further component for execution, such as runtime security manager 182.

Event intake 158 may receive events outputted by parsing and filtering component 152 for gathering and storing in log data store 170. Further, event intake 158 may build and update index 175, which would be relatively lightweight because it is restricted to exposed fields defined on a per domain basis according to plugins 153. Index 175 may also be built for existing logs stored in log data store 170. Index 175 enables efficient access to records in log data store 170 directly, thereby avoiding the need to duplicate log data store 170 into an external database service. Query interface 159 may accept and respond to matching queries for one or more records of log data store 170 by using index 175. For example, an administrator may use graphical user interface (GUI) 185 of client device 180 to access a user interface for sorting, filtering, and tracing through events that are streamed, such as from parsing and filtering component 152, or stored, such as from log data store 170. GUI 185 may use query interface 159 to retrieve records from log data store 170 according to one or more filters on exposed fields. An example GUI 185 is described below in conjunction with FIG. 4B. As shown in FIG. 1, some implementations may configure log data store 170 to be hosted on a cluster node such as cluster node 110A, thereby allowing direct local access without using network 160. In other implementations, log data store 170 may be separate from the cluster nodes.

Log data store 170 may correspond to a cloud based bulk storage service for storing gathered events and log files from various domains. As discussed above, with the assistance of index 175, records of log data store 170 can be accessed directly without replicating the log files into a full featured database.

Client device 180 may correspond to a device that is accessible to an administrative user. Client device 180 may include runtime security manager 182, which may execute various actions and display notifications received from rule engine component 154. Client device 180 may also include GUI 185, which allows for analysis of stored events on log data store 170.

Cloud service 190 may correspond to an external cloud service, such as Amazon Web Services (AWS) or a cloud service from any other vendor. Multiple cloud services may be supported by providing a corresponding plugin within plugins 153 to allow for intake of events generated by the cloud services. For example, the plugins 153 may interface with audit interfaces provided by the various cloud services.

3.0 Example Functional Diagram

Figure 2:
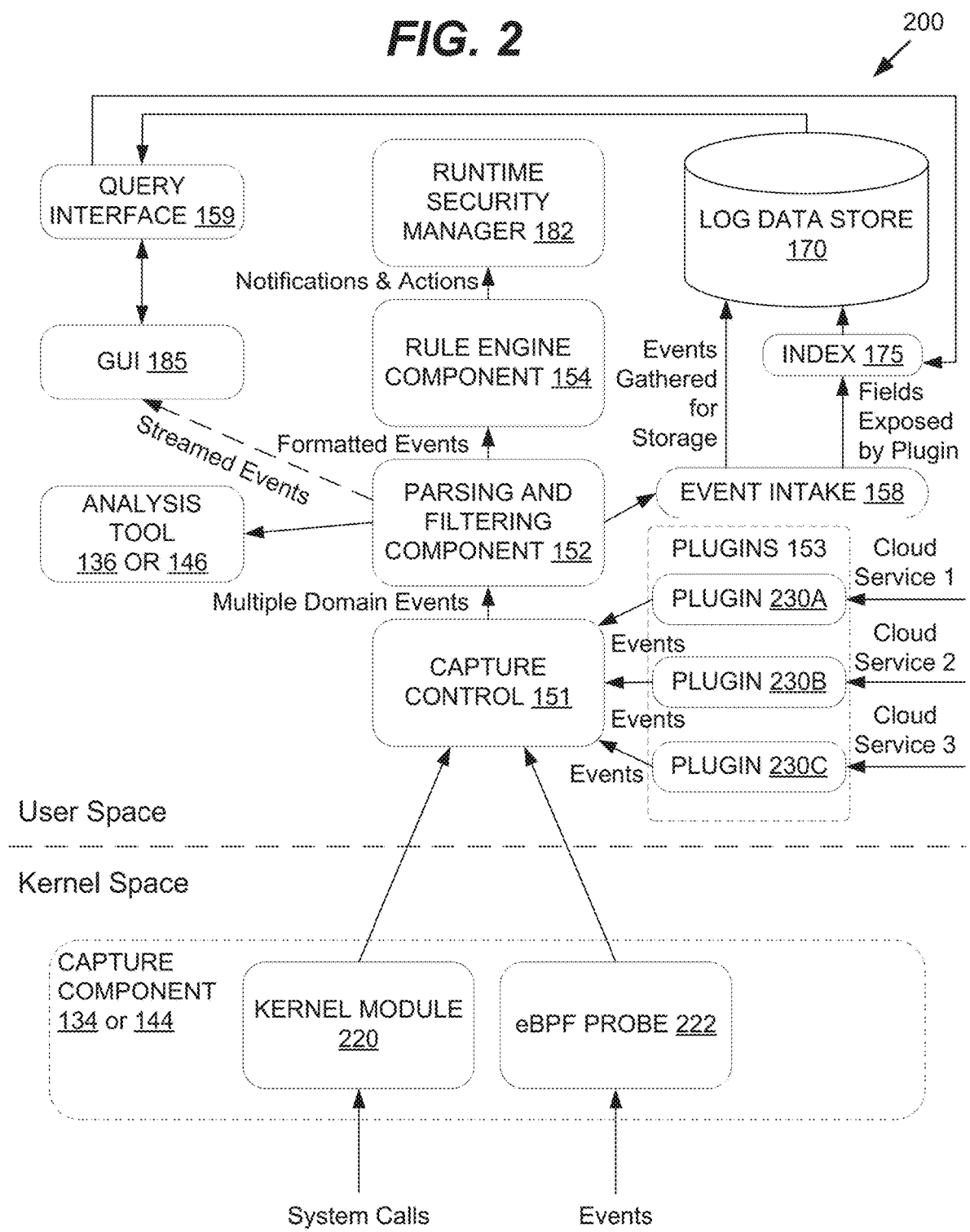
FIG. 2 illustrates an example functional diagram of data flows for capturing and processing events from multiple domains.

FIG. 2 illustrates an example functional diagram 200 of data flows for capturing and processing events and logs from multiple domains. Diagram 200 includes analysis tool 136 or 146, capture control 151, parsing and filtering component 152, rule engine component 154, event intake 158, query interface 159, log data store 170, index 175, capture component 134 or 144 including kernel module 220 and eBPF probe 222, plugins 153 including plugin 230A, plugin 230B, and plugin 230C, and runtime security manager 182.

As shown in FIG. 2, kernel module 220 and eBPF probe 222 may be components of capture component 134 or 144 and may execute in the kernel space of cluster node 110A or container 140. Kernel module 220 may be configured to read system calls of the operating system. After processing through capture control 151 and parsing and filtering component 152, the system calls can be collected into capture files (.scap files, similar to tcpdump .pcap files) that may be analyzed using tools such as analysis tool 136 or 146. The capture files may also be stored in log data store 170, wherein parsing and filtering component 152 may utilize event intake 158 to update index 175 to reference entries in the capture files stored in log data store 170. Exposed fields for capture files in index 175 may correspond to all system call fields or a subset of system call fields defined by kernel module 220, for example. Capture files may be triggered for recording manually, in response to events, or recorded continuously, and may be segmented by file size, capture duration, or other factors. eBPF probe 222 may be a computer program in eBPF bytecode that performs non-blocking event collection, type-based event packing, and memory mapped buffer handling, e.g. by using a per-CPU ring buffer for storing events. eBPF probe 222 may also read container-specific kernel data structures such as cgroups data and namespaces. The system calls and events are forwarded to capture control 151.

Capture control 151 operates as a central capture hub for capturing events from different domains. Capture component 134 is controlled to capture system calls from the host, or cluster node 110A. Capture component 144 is controlled to capture system calls from container 140. Plugin 230A, 230B, and 230C are controlled to capture streaming events from cloud service 1, 2, and 3, respectively. For example, plugin 230A may correspond to an audit interface for container manager 150. Plugin 230B may correspond to an audit interface for cloud infrastructure, such as AWS CloudTrail which may be exposed by cloud service 190. Plugin 230C may correspond to an audit interface for a different cloud vendor, such as AuditLog.

Each of plugins 230A-230C may therefore be configured to read and capture events from various domains, and new plugins can be developed to enable capture control 151 to support additional domains. The events captured by plugins 230A-230C may include, but are not limited to, user activity logs from a cloud service, application program interface (API) usage logs from a cloud service, API usage logs from a containerized application manager, API usage logs from a cloud-based orchestrator, network packet activity logs from a network, and database activity logs from a database.

For example, container manager 150 may expose an audit interface that reports on events such as creating, modifying, and destroying pods/containers, services, deployments, daemonsets, configuration maps, subscriptions to changes, and other actions. These events may be associated with specific fields that may store values or predefined keywords, which can then be used in macros or in policy rules 156. For example, the type of action (create, update, patch) may be defined in a field "ka.verb", the affected resource may be defined in a field "ka.target.resource", and the username associated with the action may be defined in a field "ka.user.name". An associated plugin or plugin 230A may receive the events generated by the audit interface of container manager 150, and plugin 230A may further define exposed fields for building index 175.

In another example, cloud service 190 may expose an audit interface, e.g. AWS CloudTrail reporting on events generated by the AWS service. Example fields may include "ct.user", the user associated with the event, "ct.region", or the region associated with the event, "ct.info", or information regarding the event, and "s3.bytes", or the number of bytes transferred to a storage server. An associated plugin or plugin 230B may receive the events from the audit interface of cloud service 190 and may also identify exposed fields for building index 175.

The events can therefore be captured from multiple domains in a streaming fashion to enable real-time analysis tasks and run-time security enforcement.

Parsing and filtering component 152 may perform various pre-processing tasks to prepare the entries received by capture control 151 prior to further processing by rule engine component 154, as described above. Besides providing the formatted and normalized output entries to rule engine component 154, parsing and filtering component 152 may also provide the output entries to other components such as to analysis tool 136 and 146 and to event intake 158 for gathering and storing the output entries into log data store 170, e.g. by appending to existing stored log files or creating new log files. In other embodiments, event intake 158 may only be responsible for generating index 175, as the log files in log data store 170 may be independently generated by other processes, such as logging services of external cloud services. Regardless of how the log files are updated in log data store 170, event intake 158 may create and update index 175 to enable random access to the entries in the stored log files of log data store 170. The granularity of index 175 may be configured according to the exposed fields defined in plugins 153, or according to use case requirements, thereby providing a lightweight index for direct access to records of log data store 170 without replication into an external database. In some embodiments, event intake 158 may be included as part of parsing and filtering component 152.

Rule engine component 154 may evaluate policy rules 156 on the output from parsing and filtering component 152 to determine one or more notifications and actions to be carried out, as described above. Once the notifications and actions are determined, they may be passed to runtime security manager 182, which carries out the determined notifications and actions. For example, runtime security manager 182 may send a notification e-mail to an administrator, cause a notification pop-up to display on an administrator's terminal or client device 180, as described below in conjunction with FIG. 4A, or send a message to an administrator using an application messaging protocol, such as for a chat or messaging application. Runtime security manager 182 may also perform one or more mitigating actions defined in policy rules 156, such as modifying a user access privilege, forcibly logging off a user, or modifying access privileges to one or more resources.

GUI 185 may provide a user interface for sorting, filtering, and tracing through events that are streamed, such as from parsing and filtering component 152, or stored, such as from log data store 170. GUI 185 may use query interface 159 to retrieve one or more records from log data store 170 matching one or more criteria according to exposed fields available in index 175. In some implementations, GUI 185 may be a command line interface. In other implementations, GUI 185 may be a graphical user interface, as illustrated below in conjunction with FIG. 4B.

GUI 185 may receive from a user or client device 180 one or more criteria for filtering event entries. GUI 185 may then use index 175 to determine a subset of entries that match the one or more criteria for retrieval from log data store 170. The retrieved entries can then be provided to the user or client device 180, for example by displaying the matching entries in a table of a graphical interface or by providing a text-based listing in a command line console. Additionally, or alternatively, streaming records from parsing and filtering component 152 may also be matched to the one or more criteria, as indicated by the dotted arrow to GUI 185.

4.0 Example Policy Rules

FIG. 3 illustrates example unified policy rules for applying on normalized domain independent streaming event data. As shown in FIG. 3, each policy rule 156A and 156B may include various definition fields, including rule name, human-readable description, condition for triggering, remedial action to carry out after triggering, and notification text. The condition for triggering may be written in a simplified and human-readable script language.

Example policy rule conditions may include, but are not limited to: accessing a defined file or location, successful login to a defined resource, successful login as a defined user, successful login within a defined time range, successful login from a defined geographic location, successful login without using multi factor authentication, exceeding a threshold for usage of a computing resource, and transferring data above a threshold size to a remote location. These conditions may detect unusual and suspicious activity, such as attempted access to sensitive resources, accesses at non-typical hours and from non-typical locations, unusual network transfer activity, and unusual resource usage that may indicate a virus or cryptocurrency miner.

Examining policy rule 156A, this rule is defined to detect whether certain critical container shell configuration files are opened for attempted modification. This may correspond to a system call "Container_Open_Write" which opens a file in a container in a read/write mode. As shown in the condition field, when "Container.EventName="Container_Open_Write"" and the file is determined to be a shell configuration file, then the condition is matched. The clause (fd.filename in (shell_config_filenames) or fd.name in (shell_config_files) or fd.directory in (shell_config_directories)) determines whether the opened file is a shell configuration file, e.g. by having a matching filename or directory location. Additionally, some exceptions are provided to exclude non-user processes, such as "not proc.name in (shell_binaries)" to exclude system processes, and "not exe_running_docker_save" to exclude container maintenance processes. When the condition is satisfied, the defined action is carried out, or in this case sending a notification to ADMIN1 with the message defined in the notification field. As shown in the notification field, pertinent information regarding the attempted modification is provided to the administrator, and the administrator may be given options for performing analysis and mitigation, as described below in conjunction with FIGS. 4A and 4B.

Policy rule 156A may use matching values that are limited to a container namespace, and therefore only processes in a container 140 may be evaluated for policy rule 156A. For example, as shown in policy rule 156A, fields and keywords may be prefixed with "Container." to specify the container namespace. In another example, to limit matching to AWS cloud services, the fields and keywords may be prefixed with "AWS." to indicate an AWS namespace. This may result in rule matching being limited to plugins that intake events from AWS cloud services. In some implementations, common keywords and field names may be enforced across namespaces for consistency and ease of use. Additionally, a unified rule syntax may also be employed across namespaces so that logic may be carried out in a consistent manner.

Other policy rules may use a wider namespace, such as a global namespace that is applicable to all domains. Such an example rule is shown in policy rule 156B, which is defined to detect a successful login without multi factor authentication for any domain. As shown in the condition field, the scope is changed from Container to Global, and thus policy rule 156B may be matched to any domain. The phrase "Global.EventName="ConsoleLogin"" matches to any login from any domain, the phrase "not Global.ErrorCode exists" avoids any logins that generate an error, the phrase "Global.EventValue[LoginResult]="Success"" matches to logins that are successful, and the phrase "Global.EventValue[MFAUsed]="False"" matches to logins that do not use multi factor authentication. When the condition is satisfied, the action to be carried out includes notifying ADMIN1 and forcing a logoff of the user, which is illustrated in conjunction with FIG. 4A below.

Note that both policy rule 156A and policy rule 156B can be defined using a unified syntax. Thus, the policy rules 156 can be built to apply across single or multiple domains as desired. This can help to promote uniform application of policy rules across various domains, rather than creating piecemeal rule engines or rule syntaxes for each potential domain. Further, maintenance and troubleshooting of policy rules 156 can be carried out in a centralized manner using rule engine component 154, reducing the risk of introducing conflicting or inconsistent rules.

5.0 Example User Interfaces

Figure 4A:
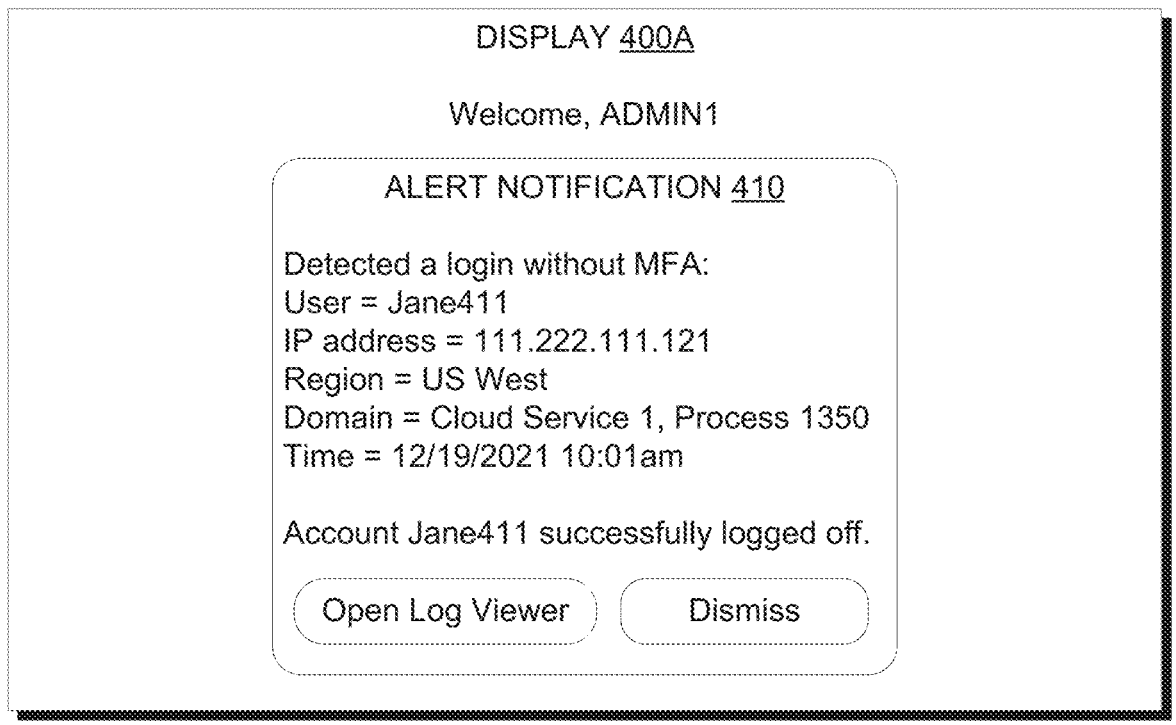
FIG. 4A illustrates an example notification triggered by a unified policy rule.

FIG. 4A illustrates an example notification triggered by a unified policy rule. As shown in display 400A, the alert notification 410 corresponds to the notification field of policy rule 156B and may be displayed on a terminal of ADMIN1. Display 400A may correspond to runtime security manager 182 shown on a display of client device 180. In addition to the notification field, the action of forcing the user to logoff is also executed and reported, and the user is provided with the option to dismiss the notification or to investigate further by opening a log viewer.

Figure 4B:
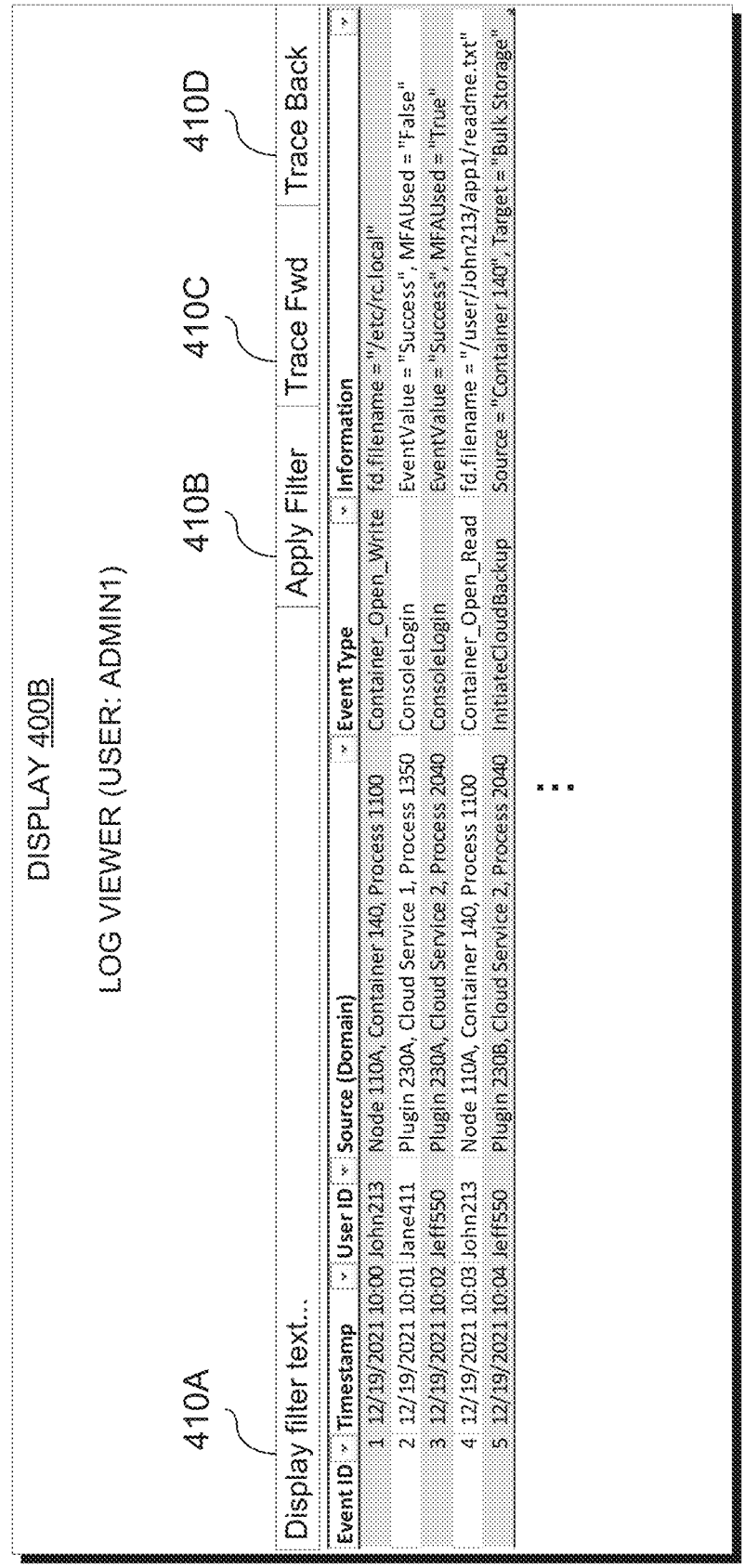
FIG. 4B illustrates an example user interface for viewing, sorting, and filtering events.

FIG. 4B illustrates an example user interface for viewing, sorting, and filtering log data. Display 400B may correspond to display 400A after choosing the "Open Log Viewer" option. Display 400B may correspond to GUI 185 shown in a display of client device 180. GUI 185 may also be initiated separately from runtime security manager 182. As shown in display 400B, a table of events may be presented to the user with various fields derived from the event records and represented by columns. The example fields include EventID, Timestamp, User ID, Source (Domain), Event Type, and Information. The fields shown may be according to the fields exposed by plugins 153 and may include greater or fewer than those shown in display 400B. Example alternative fields may include a protocol or API type, an entry record size, a service name, a privilege level, and one or more content fields.

By interacting with any of the columns, the user can initiate an ascending or descending sorting operation on the field represented by the selected column. For example, clicking on the EventID column may reverse the sort order so that EventIDs are listed in descending order from 5 to 1. Multiple levels of sorting may also be supported.

By using text box 410A, the user may also enter filter keywords as desired. For example, if the user is interested in the activities of Jane411, the user may type in "Jane411" into text box 410A, and only the records including "Jane411" in at least one of the fields may be shown. In display 400B, this may correspond to EventID 2; thus, EventID 1 and 3-5 may be hidden after clicking button 410B to apply the filter from text box 410A. In some implementations, the user may specify the fields that the filter applies, such as by the filter "UserID=Jane411". Various keywords such as "and", "or", "greater than", "less than", etc. may be supported for advanced filtering of multiple fields and value ranges.

By using buttons 410C and 410D, the user can also trace forwards and backwards through the records according to a shared field, which may be defined in text box 410A. For example, the user may be interested in all of the events associated with "UserID=Jane411", and may use button 410C to highlight and skip to the next event that matches "UserID=Jane411". Similarly, button 410B may highlight and backtrack to the previous event that matches "UserID=Jane411".

Note that the actions permitted in display 400B are limited to predefined fields for performing sorting, filtering, and tracing actions. Since only these operations need to be supported, there is no requirement to replicate the event records into a database for supporting open ended database queries. As discussed above, by using index 175, the stored records in log data store 170 can be queried in place without remote transport or import into a database management system.

GUI 185 illustrated in display 400B may be updated via queries issued to query interface 159, which in turn uses index 175 to retrieve records from log data store 170. For example, referring to FIG. 2, the parsing and filtering component 152 may receive log data generated from a plurality of domains, including container manager 150 and applications 142 running within container 140 of a cloud platform managed by container manager 150. One of plugins 230A-230C may receive information associating a domain with a proper subset of fields of a plurality of fields included in the log data generated by the domain. Event intake 158 may create index 175 based on the proper subset of fields of one of plugins 230A-230C. Query interface 159 may receive a query from GUI 185 of client device 180 specifying one or more of the proper subset of fields and no field that is in the plurality of fields but not in the proper subset of fields. Query interface 159 may generate a set of hits to the query based on index 175. The set of hits may include all the plurality of fields from log data store 170, rather than just the proper subset of fields from index 175. Query interface 159 may transmit information regarding the set of hits to client device 180 to be reflected in GUI 185.

6.0 Example Processes

Figure 5:
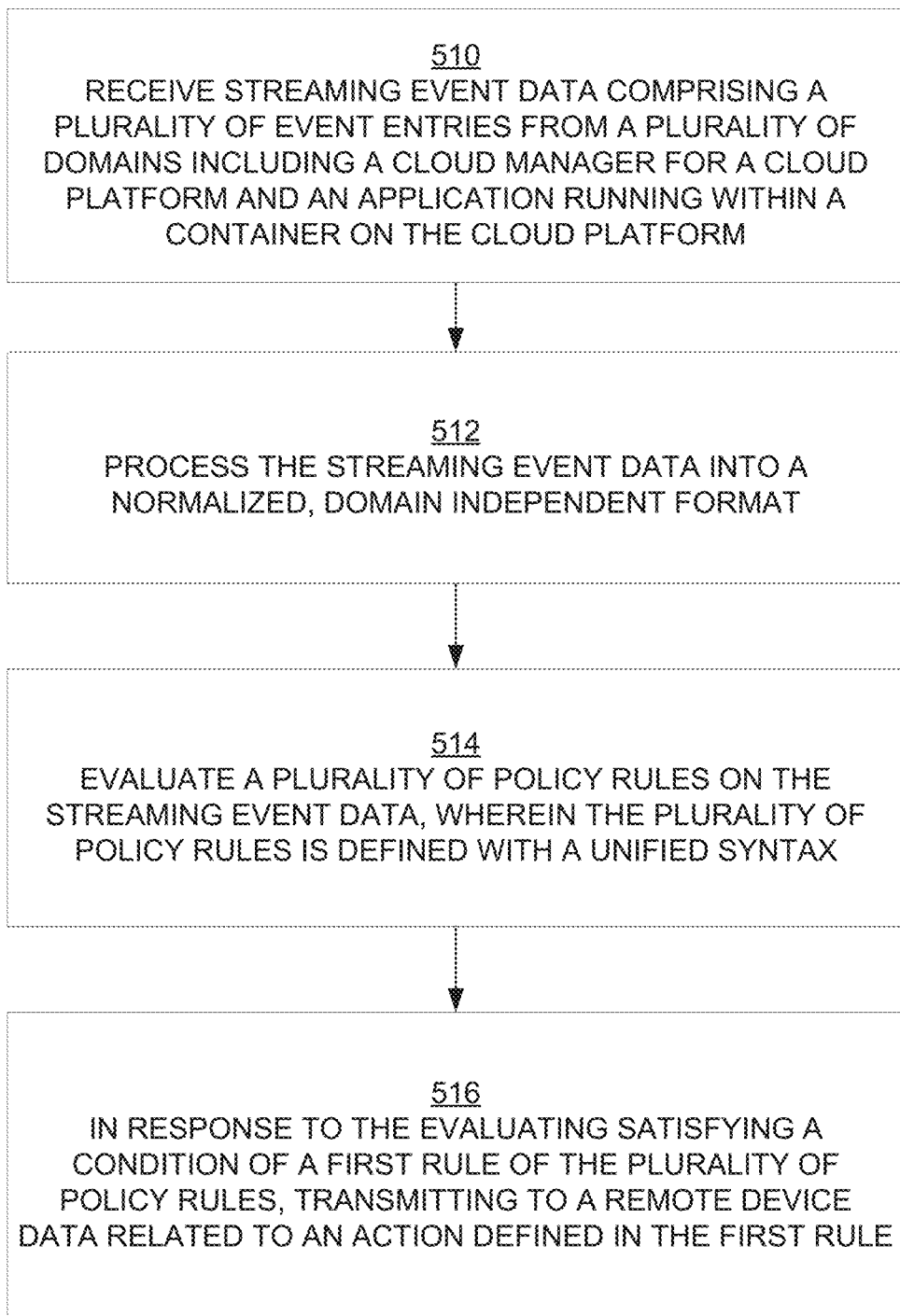
FIG. 5 illustrates an example process of providing unified event monitoring and log processing from multiple domains.

FIG. 5 illustrates an example process of providing unified event monitoring and log processing from multiple domains. FIG. 5 is shown in simplified, schematic format for purposes of illustrating a clear example and other embodiments may include more, fewer, or different elements connected in various manners. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring back to FIG. 1, in step 510, capture control 151 receives streaming event data comprising a plurality of event entries from a plurality of domains including container manager 150 for a cloud platform and applications 142 running on container 140 executing on cluster node 110A on the cloud platform. For example, the kernel module 220 of FIG. 2 may receive and forward system calls from applications 142 executing on container 140. Additionally, the eBPF probe 222 may also forward events from applications 142 executing on container 140. Plugins 153 including plugins 230A-230C may also receive events from external cloud services, such as from audit interfaces exposed by the cloud services. Capture control 151 may thus receive the forwarded system calls and events, and may also receive from other domains such as container manager 150 and various cloud services via plugins as illustrated in FIG. 2.

In step 512, parsing and filtering component 152 processes the streaming event data into a normalized, domain independent format. For example, as discussed above, the policy rules may be defined using a global namespace that is applicable to all domains. Since the event data fields may vary in format and content depending on the specific originating domain, the streaming event data may be parsed for event field data that is normalized or converted into fields in the global namespace so that rules can be defined on the events using the global namespace, as described above for policy rule 156B. However, as discussed above, the rules may also be defined for narrower namespaces as well.

In step 514, rule engine component 154 evaluates policy rules 156 on the streaming event data, wherein the policy rules 156 are defined using a unified syntax. As discussed above in conjunction with FIG. 3, each of the policy rules 156 can be defined to apply to single or multiple domains.

In step 516, in response to step 514 satisfying a condition of a first rule of policy rules 156, rule engine component 154 transmits to runtime security manager 182 data related to an action defined in the first rule. For example, as discussed above in conjunction with FIG. 3, when one of the policy rule conditions is satisfied, then the associated actions can be passed from rule engine component 154 to runtime security manager 182 for execution, and the actions may include notifications as well as mitigating actions.

7.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
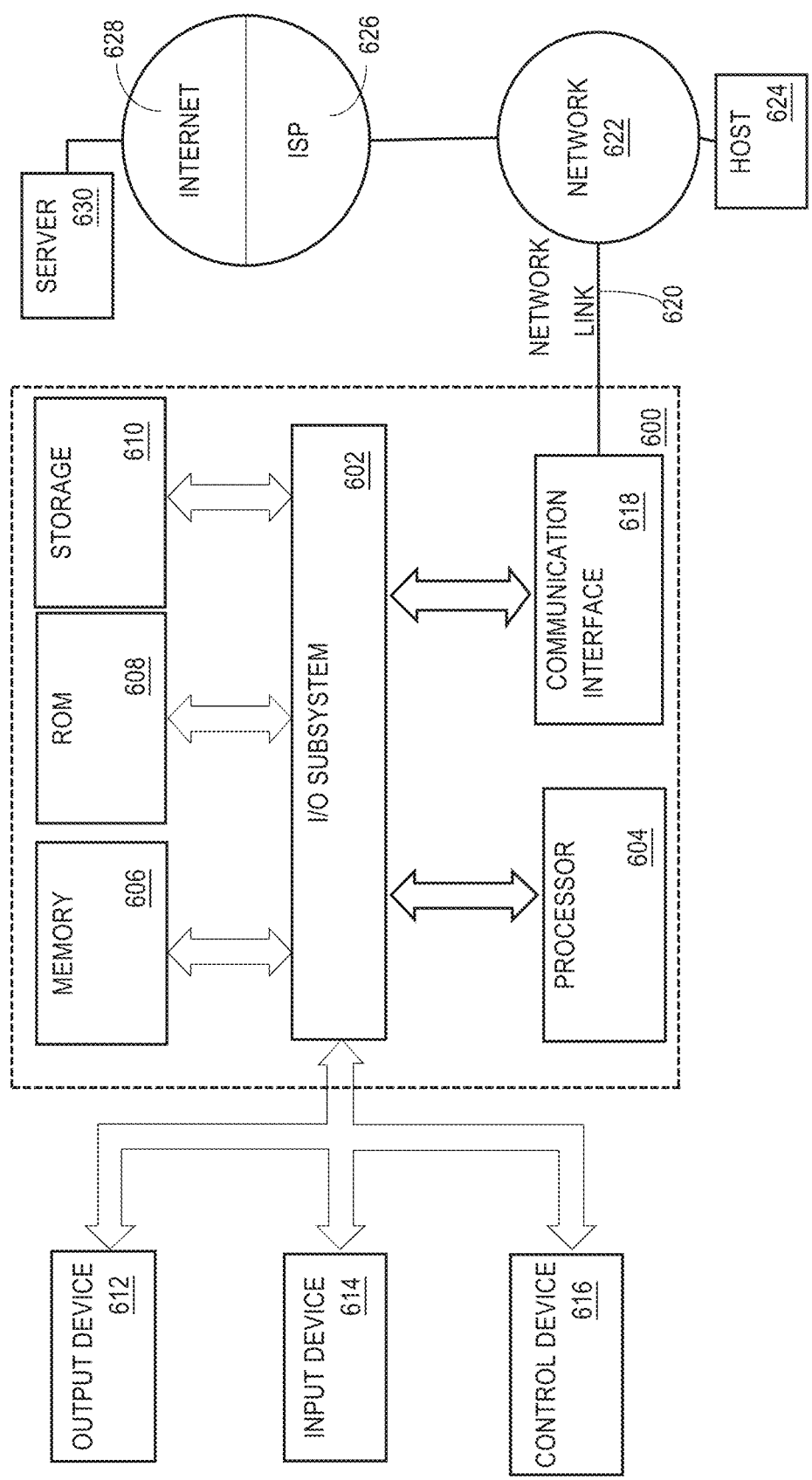
FIG. 6 depicts a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

8.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of providing unified event monitoring and log processing, the method comprising:
   receiving streaming event data comprising a plurality of event entries from a plurality of domains including a cloud manager for a cloud platform and an application running within a container on the cloud platform,
   a certain event entry of the plurality of event entries being related to system calls made by the application running within the container;
   the receiving comprising setting up a cloud service plugin that exposes a proper subset of a set of fields in the streaming event data from a domain other than a specific application running within a specific container;
   processing the streaming event data into a normalized, domain-independent format;
   evaluating a plurality of policy rules on the streaming event data, wherein the plurality of policy rules relates to information security and access control within the cloud platform; and
   in response to the evaluating satisfying a condition of a first rule of the plurality of policy rules, transmitting to a remote device data related to an action defined in the first rule,
   wherein the receiving, processing, evaluating, and transmitting for each event entry for the plurality of event entries are performed in real time.

2. The computer-implemented method of claim 1, wherein the method is performed in a user mode, and
   wherein the plurality of event entries from the application running within the container are captured by a system call capture component executing in a kernel mode of the container,
   wherein the certain event entry includes a first identifier of the application running within the container and a second identifier of the container.

3. The computer-implemented method of claim 1,
   wherein receiving the streaming event data comprises the plurality of event entries including plugin event entries received from the cloud service plugin, and
   wherein processing the streaming event data includes generating an index for accessing the plugin event entries based on the proper subset of fields exposed by the cloud service plugin.

4. The computer-implemented method of claim 1, wherein receiving the streaming event data uses a capture plugin such that the plurality of event entries further comprises at least one of:
   user activity logs from a cloud service;
   application program interface (API) usage logs from a cloud service;
   API usage logs from a containerized application manager;
   network packet activity logs from a network; and
   database activity logs from a database.

5. The computer-implemented method of claim 1, further comprising:
   storing log data comprising a plurality of records based on the streaming event data in a cloud-based storage; and
   generating an index to access the log data stored in the cloud-based storage.

6. The computer-implemented method of claim 5, wherein at least one of the cloud-based storage and the index is accessible without traversing a network.

7. The computer-implemented method of claim 5, further comprising:
   receiving a request for information in the log data matching one or more criteria;
   determining, based on the index, a subset of the plurality of records that match the one or more criteria; and
   responding to the request by providing the subset of the plurality of records retrieved from the cloud-based storage.

8. The computer-implemented method of claim 7, wherein the subset of the plurality of records is retrieved from a flat file in the cloud-based storage.

9. The computer-implemented method of claim 7, wherein determining, based on the index, the subset of the plurality of records uses one or more predefined filters on predefined fields.

10. The computer-implemented method of claim 9, wherein the predefined fields include at least one of:
    a domain from the plurality of domains;
    a protocol or API type;
    an entry record size;
    a timestamp;
    a username;
    a service name;
    a privilege level; and
    one or more content fields.

11. The computer-implemented method of claim 9, further comprising:
    receiving a request to trace from a first record in the subset of the plurality of records; and
    providing a second record from the subset of the plurality of records to respond to the request to trace.

12. The computer-implemented method of claim 1, wherein the data related to the action defined in the first rule comprises at least one of:
    a notification e-mail to be sent;
    a pop-up notification to be displayed;
    a message to be sent using an application messaging protocol; and
    a mitigating action including at least one of: modifying a user access privilege, forcibly logging off a user, and modifying access privileges to one or more resources.

13. The computer-implemented method of claim 1, wherein the condition of the first rule comprises:
    accessing a defined file or location within the plurality of domains;
    successful login to a defined resource;
    successful login as a defined user;
    successful login within a defined time range;
    successful login from a defined geographic location; and
    (1) successful login without using multi factor authentication;
    (2) exceeding a threshold for usage of a computing resource; or
    (3) transferring data above a threshold size to a remote location.

14. A system for providing unified log processing and querying, comprising: a memory;
    one or more processors coupled to the memory and configured for:
    receiving, within a cloud platform, log data generated from a plurality of domains, including a cloud manager for the cloud platform and an application running within a container on the cloud platform, the log data from the application running within the container being based on system calls made by the application, a certain domain of the plurality of domains, other than a specific application running within a specific container, being associated with a plugin that exposes a specific proper subset of a set of fields in the log data from the certain domain;

receiving information associating a domain of the plurality of domains with a proper subset of fields of a plurality of fields included in the log data generated by the domain;

creating an index based on the proper subset of fields;

receiving a query from a device specifying one or more of the proper subset of fields and no field that is in the plurality of fields but not in the proper subset of fields;

generating, from the log data, a set of hits to the query based on the index; and transmitting information regarding the set of hits to the device.

15. One or more non-transitory computer-readable storage media storing instructions which when executed cause one or more processors to perform a method of providing unified event monitoring and log processing, the method comprising:

receiving streaming event data comprising a plurality of event entries from a plurality of domains including a cloud manager for a cloud platform and an application running within a container on the cloud platform, a certain event entry of the plurality of event entries being related to system calls made by the application running within the container;

the receiving comprising setting up a cloud service plugin that exposes a proper subset of a set of fields in the streaming event data from a domain other than a specific application running within a specific container;

processing the streaming event data into a normalized, domain-independent format;

evaluating a plurality of policy rules on the streaming event data, wherein the plurality of policy rules relates to information security and access control within the plurality of domains; and in response to the evaluating satisfying a condition of a first rule of the plurality of policy rules, transmitting to a remote device data related to an action defined in the first rule, wherein the receiving, processing, evaluating, and transmitting for each event entry for the plurality of event entries are performed in real time.

16. The one or more non-transitory computer-readable storage media of claim 15, wherein the method is performed in a user mode, and wherein the plurality of event entries from the application running within the container are captured by a system call capture component executing in a kernel mode of the container, wherein the certain event entry includes a first identifier of the application running within the container and a second identifier of the container.

17. The one or more non-transitory computer-readable storage media of claim 15, wherein the method further comprises receiving the streaming event data to use a capture plugin such that the plurality of event entries further comprises at least one of:

user activity logs from a cloud service;

API usage logs from a cloud service;

API usage logs from a containerized application manager;

network packet activity logs from a network; and database activity logs from a database.

18. The one or more non-transitory computer-readable storage media of claim 15, wherein the method further comprises:

storing log data comprising a plurality of records based on the streaming event data in a cloud-based storage; and generating an index to access the log data stored in the cloud-based storage.

19. The one or more non-transitory computer-readable storage media of claim 18, wherein the method further comprises:

receiving a request for information in the log data matching one or more criteria;

determining, based on the index, a subset of the plurality of records that match the one or more criteria; and responding to the request by providing the subset of the plurality of records retrieved from the cloud-based storage.

20. The one or more non-transitory computer-readable storage media of claim 19, wherein the subset of the plurality of records is retrieved from a flat file in the cloud-based storage.

* * * * *